Figure 1:
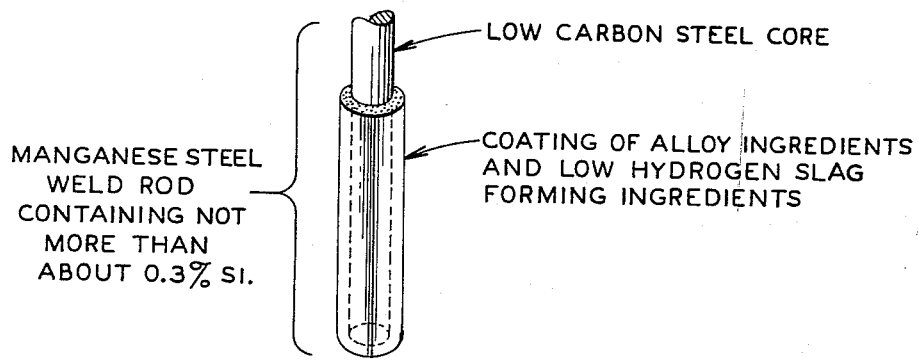

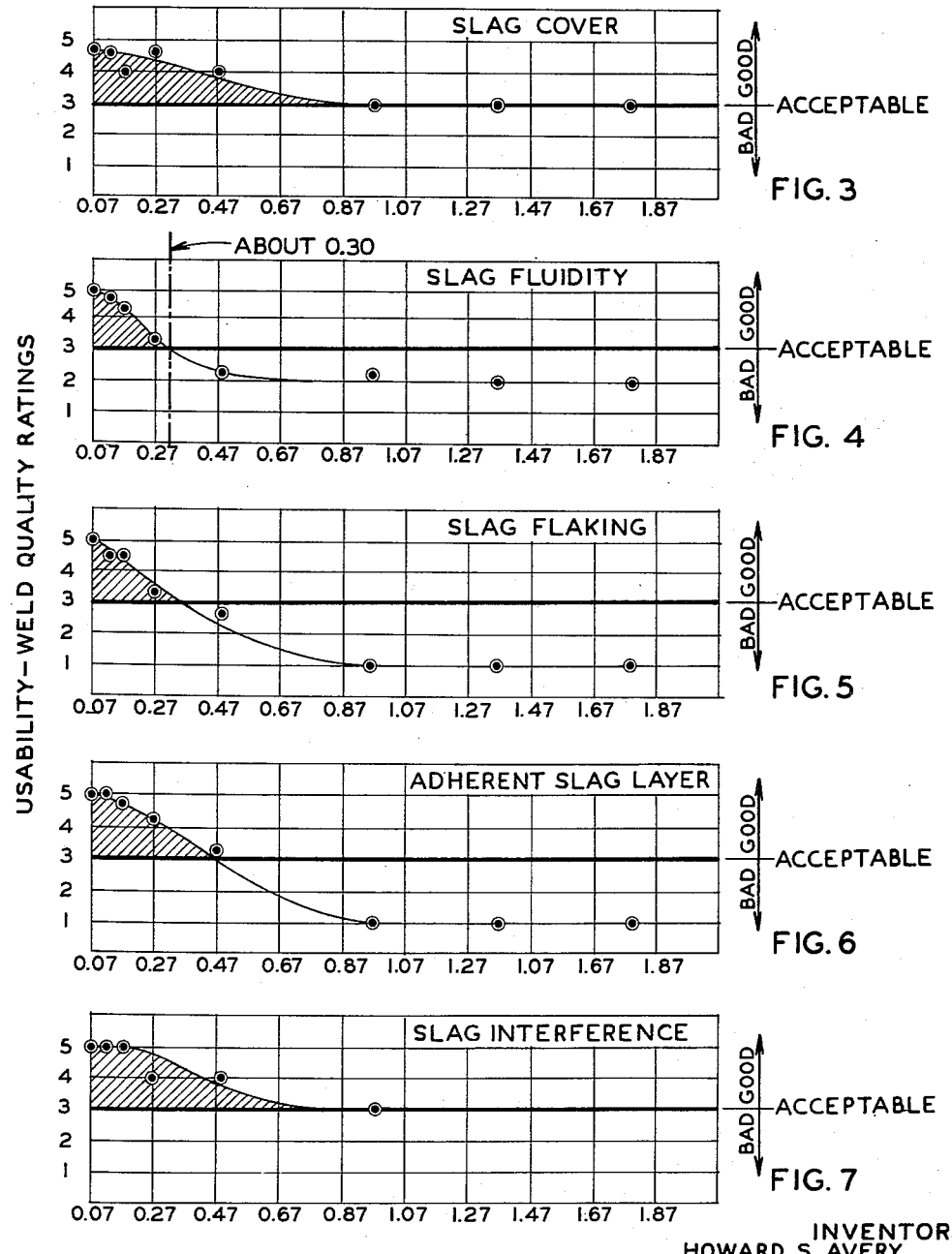

USABILITY
WELD QUALITY RATINGS v.s. WELDING ROD SILICON METAL CONTENT
| NOMINAL DEPOSIT ANALYSIS | A | B | C |
|---|---|---|---|
| CARBON | 0.6 | 0.6 | 0.6 |
| MANGANESE | 14.0 | 14.0 | 14.0 |
| CHROMIUM | — | 4.0 | — |
| NICKEL | — | — | 3.5 |
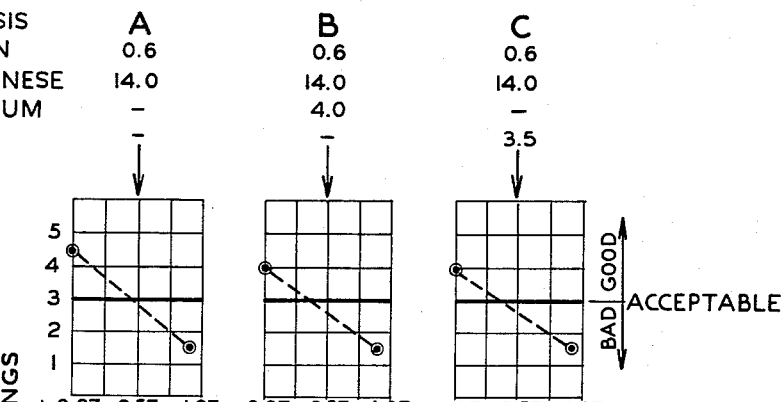
FIG. 8 — SLAG FLAKING
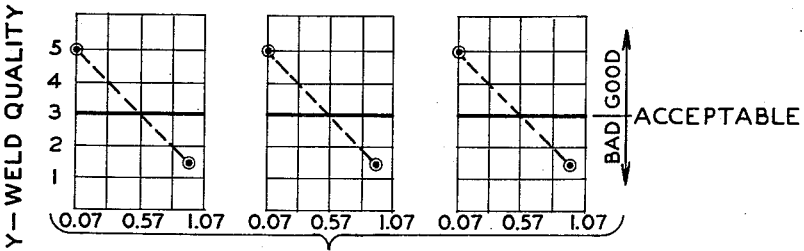
FIG. 9 — ADHERENT SLAG LAYER
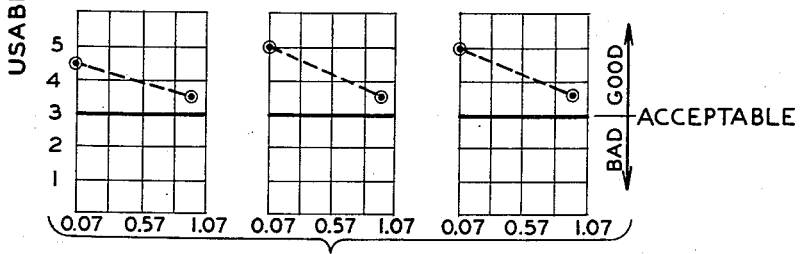
FIG. 10 — SLAG INTERFERENCE
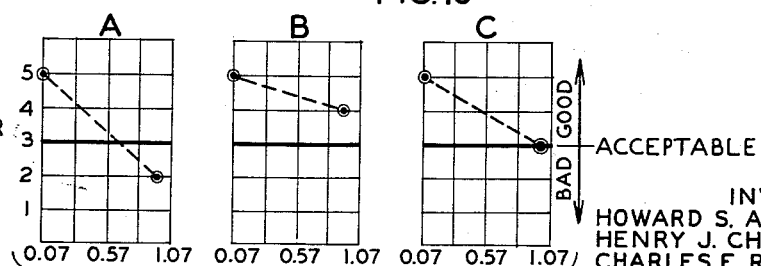
FIG. 11 — BEAD CONTOUR AND BUILD UP
WELDING ROD SILICON METAL CONTENT
INVENTORS.
HOWARD S. AVERY
HENRY J. CHAPIN
CHARLES E. RIDENOUR

United States Patent Office 3,118,760
Patented Jan. 21, 1964

3,118,760
WELDING RODS
Howard S. Avery and Henry J. Chapin, Mahwah, N.J., and Charles E. Ridenour, Chicago Heights, Ill., assignors to American Brake Shoe Company, New York, N.Y., a corporation of Delaware
Filed Apr. 24, 1961, Ser. No. 105,046
6 Claims. (Cl. 75—123)

This invention relates to a welding electrode or rod for welding of austenitic manganese steel parts, joining, rebuilding and fabricating, and kindred uses, and which is adapted to deposit a strong, tough, non-porous crack-free austenitic manganese steel weldment. This application is a continuation-in-part of application Serial No. 771,970, filed November 5, 1958, now abandoned.

The welding rod or electrode of the present invention is a so-called composite electrode which in one commercial form embodies a low carbon steel wire core having an exterior adherent coating of alloy ingredients together with slag forming and protective gas shield ingredients. The welding rod or electrode of the present invention can also be in the form of a filled tube comprising a low carbon steel sleeve filled with the alloy and slag forming ingredients. The alloy ingredients taken in conjunction with the composition of the core or sleeve are balanced to produce an air toughening, austenitic, nickel-chromium modified austenitic manganese steel deposit, and this deposit in appearance is characterized by a desirable high, well rounded bead having little tendency to flow out flat during deposition in contrast to known composite manganese steel weldments which flow easily and result in an undesired flat deposit. The achievement of such a deposit represents one of the primary objects of the present invention.

As is well known in this art, it is common practice to superimpose weld deposits particularly in the case of building up worn parts of manganese steel. One troublesome aspect of such multiple bead deposits has been inferior structure induced in the lower deposit or bead due to re-heating thereof at the time when the upper deposit or bead is being laid down. It has been found that the welding electrode of the present invention, due to an advantageous nickel and chromium alloying, does not display such reheating problems to any marked degree. Previous attempts to solve the twin problems of bead reheating embrittlement and low yield strength have involved nickel additions, molybdenum additions, or combinations of alloying elements in low percentage. Some of these attempts provide fair results for one or the other of the problems. The present invention does better for the combination of both high yield strength and ductility in the reheated zones.

It is practically essential in welding rods or electrodes of the kind under consideration to provide for slag coverage simultaneously with the weld deposit in order to protect the latter during the cooling period. Heretofore, many such slag coverages have been accompanied by a pronouncedly dangerous and uncontrolled popping and flaking off of the slag during welding together with an adherent slag underlayer, and another object of the present invention is to substantially prevent this while assuring the slag can be easily removed when purposely so intended. In this connection, another object of the present invention is to reduce the silicon content in the rod to as low as possible commensurate with the need for some silicon, since it has been found in accordance with the present invention that by maintaining the silicon content at low levels there is less slag popping and the fluidity of the slag is well controlled.

Other objects of the present invention are to achieve nickel-chromium modified manganese steel weld deposits of high strength, substantial crack resistance and ease of deposition.

Figure 2:
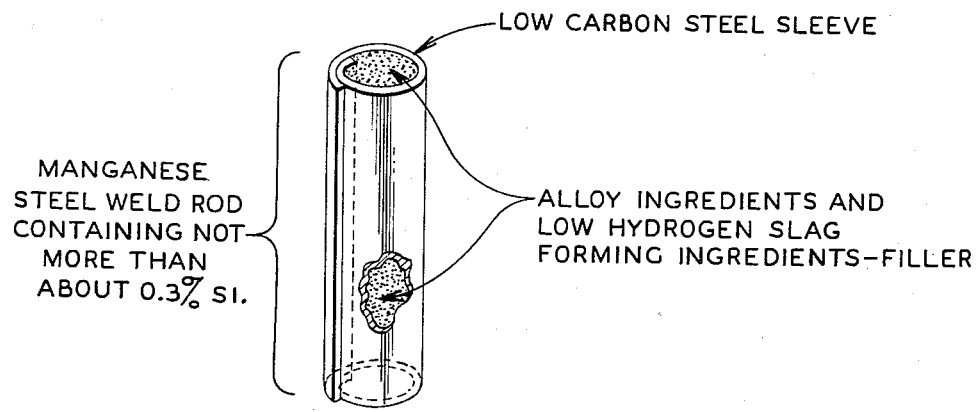

In the drawings:

FIGS. 1 and 2 are perspective views, partly in section, of fragments of welding rods of the kind contemplated by the present invention;

FIGS. 3 to 10 include curves showing performance characteristics of welding rods under the present invention; and FIG. 11 is a group of curves showing bead build-up and contour as effected by various alloy ingredients.

In accordance with the present invention, a welding rod or electrode is produced embodying a low carbon steel carrier member in the form of a solid elongated wire core or sleeve. Associated with and carried by this solid ferrous metal member are granular or divisible slag forming ingredients and alloy ingredients, the latter which cooperate in conjunction with the alloy content of the steel core or sleeve member to produce an austenitic, air-toughening manganese steel weld deposit modified by the presence of a neckel-chromium alloy. The silicon content is quite low having the result mentioned above, and the phosphorous content does not exceed about 0.025% thereby minimizing crack formation. The nickel-chromium alloy contributes high tensile strength, and one of the important features of the present invention is the fact that there is very little flow of the weldment during deposit thereof thus producing a bead of high height or build-up.

The slag forming ingredients are of the low hydrogen type and include titanium dioxide and calcium carbonate. Particularly in the instance of a coated core rod, sodium silicate constitutes the source of the binder ingredient for the stiff paste that is to be extruded onto the core member. The titanium dioxide also serves as an arc stabilizer, and during welding the calcium carbonate decomposes to produce a protective carbon oxide shielding gas about the immediate adjacent areas of welding thereby precluding air from gaining access to the arc as the hot metal travels across the arc and onto the surface which is receiving the weldment.

The slag, whether obtained from a coating on a core or fillers in a tube, is easily removed after the weldment has cooled sufficiently, and there is no popping or spattering of the slag during welding. This is believed to be due to the low silicon content of the rod in view of data set forth hereinafter.

In producing coated core welding rods in accordance with the present invention, the slag forming and alloy forming ingredients embodied in the coating are homogeneously mixed and transformed into a stiff paste. This paste is then extruded onto the rod in a continuous fashion in a manner well known in the art. Hence, the procedure for applying the coating to the rod need not be described in detail herein and the examples to be set forth hereinafter are restricted to the necessary formulations. It should however be pointed out that the paste is obtained by addition to the dry ingredients of a binder in the form of a water dispersion of sodium silicate (water glass) which when dry in the ultimate situation affords silicon and sodium oxides as mentioned above. Additionally, the composition to be coated onto the core by the well known extrusion technique includes sodium alginate, an innocuous material which imparts desirable plasticity or softness to the paste composition.

Reference has been made in preceding paragraphs to the deposition of an air toughening, nickel-chromium modified austenitic manganese steel deposit. No injury to properties or performance will result from the substitution of other metals in the chromium group of elements (Cr, Mo, W) together with vanadium of the adjoining group for part of the chromium as long as the chromium itself is present in excess of about 2%. However, it is to be stressed that insofar as usability is concerned, that is, slag and arc performance, nickel and chromium apparently are not important. This also applies to the filled tube form of the invention.

In the examples to follow, ferrochrome (67% chromium, 24% iron) of high carbon and low silicon content is utilized as the primary source of iron and chromium in the coating composition, but it will be realized that this is merely a convenient form and that iron could be present as powdered iron or in a larger diameter wire and the chromium could be present as chromium metal per se. Likewise, under such circumstances of substitution, the carbon content of the electrode would be increased by increasing the graphite content in the coating or filler material. In this connection, it should be pointed out that as a practical matter the rod diameters in the present instance can vary from five thirty-seconds to one-quarter inch. The thickness of the coating correspondingly varies between about 0.043 inch and 0.072 inch. Other dimensions are of course possible.

Example 1 below sets forth variations in composition for a coated core rod which are known from actual field investigations to represent commercially acceptable welding electrodes for slightly varying situations insofar as manganese steel weld deposits under the present invention are concerned.

*Example 1*

PREFERRED RANGE

Ingredient: Parts by weight
    Manganese (electrolytic) _____ 14.30 to 15.16
    Nickel powder _____ 2.64 to 2.79
    High carbon ferrochrome [1] _____ 4.81 to 5.09
    Powdered graphite (carbon) _____ 0.38 to 0.40
    Sodium alginate _____ 0.36 to 0.38
    Asbestos floats _____ 0.30 to 0.31
    Calcium carbonate _____ 5.64 to 5.98
    Titanium dioxide _____ 3.25 to 3.44
    Sodium silicate, water glass (dry analysis) _____ 2.32 to 2.45
    Low carbon steel wire [2] _____ 64.00 to 66.00

[1] Analysis: Percent
    C _____ 8
    Si _____ 1
    Cr _____ 67
    Fe _____ 24

DEPOSIT ANALYSIS

[2] See following table:
    C _____ 0.10 to 0.16.
    Mn _____ 0.30 to 0.60.
    Si _____ 0.030.
    P _____ 0.025 max.
    S _____ 0.035 max.
    Fe _____ Balance for 100.00.
Carbon _____ 0.65–0.85
Manganese _____ 13.5–14.5
Nickel _____ 3.0–4.0
Chromium _____ 3.5–4.5
Silicon, max _____ 0.20
Phosphorus, max _____ 0.025
Iron _____ Balance Example 2 represents a specific working example having a wide range of industrial application:

*Example 2*

| Ingredient | Coating, parts by weight [a] | Electrode, parts by weight |
|---|---|---|
| Manganese | 42.11 | 14.76 |
| Nickel powder | 7.75 | 2.72 |
| Ferrochrome [1] | 14.18 | 4.95 |
| Powdered graphite (carbon) | 1.11 | 0.39 |
| Asbestos floats | 0.87 | 0.30 |
| Calcium carbonate | 16.61 | 5.80 |
| Titanium dioxide | 9.55 | 3.34 |
| Sodium (or potassium) silicate | 6.81 | 2.38 |
| Sodium (or potassium) alginate | 1.03 | 0.36 |
| Low carbon steel wire [2] | | 65.00 |

[a] Coating is 35.0% weight in the rod.
[1] Analysis: See Example 1.
[2] See following table:
    C _____ 0.13
    Mn _____ 0.45
    Fe _____ 99.35
    Si _____ 0.03

*Example 2*

Deposit analysis:
    Carbon _____ 0.75
    Manganese _____ 14.0
    Nickel _____ 3.5
    Chromium _____ 4.0
    Silicon _____ 0.10
    Phosphorus _____ 0.015
    Iron, remainder (substantially).

Electrode percentage (alloy ingredients only):
    Carbon _____ 0.87
    Manganese _____ 15.05
    Nickel _____ 2.72
    Chromium _____ 3.32
    Silicon _____ 0.07
    Iron _____ 65.69

Based on extensive field and laboratory investigations, the ranges set forth in Example 1 can be broadened slightly as set forth in Example 3 immediately following.

*Example 3*

ACCEPTABLE LIMITS

Ingredient: Parts by weight
    Manganese (electrolytic) _____ 13.2 to 16.2
    Nickel powder _____ 2.0 to 4.0
    High carbon ferrochrome [1] _____ 3.7 to 6.7
    Powdered graphite (carbon) _____ 0.2 to 0.4
    Sodium alginate _____ 0.3 to 0.4
    Asbestos floats _____ 0.2 to 0.4
    Calcium carbonate _____ 5.1 to 6.5
    Titanium dioxide _____ 2.9 to 3.8
    Sodium silicate (dry) _____ 2.1 to 2.7
    Low carbon steel wire [2] _____ 62.0 to 68.0

[1,2] Analyses: See Example 1.

It will be realized that the alloy ingredients in the coating combine with the low carbon steel wire or core during the course of welding. Hence these two sources of the alloy ingredients can be considered in combined form as in Example 4 which follows, and which sets forth ranges which produce satisfactory rods as will be explained hereinafter. Example 4 also sets forth the analysis of the corresponding ultimate nickel-chrome, low silicon, low phosphorus manganese steel deposits:

Example 4

TOTAL INGREDIENTS—ELECTRODE (PARTS BY WEIGHT)

| Ingredients | AB-1 a | AB-2 b |
|---|---|---|
| Manganese metal (100% Mn) | 12.43 | 17.71 |
| Nickel powder (100% Ni) | 2.30 | 3.26 |
| Ferrochrome [1] | 4.17 | 5.94 |
| Powdered graphite | 0.33 | 0.47 |
| Asbestos floats | 0.25 | 0.36 |
| Calcium carbonate | 4.89 | 6.96 |
| Titanium dioxide | 2.82 | 4.01 |
| Sodium silicate c | 2.01 | 2.86 |
| Potassium alginate | 0.30 | 0.43 |
| Low carbon steel wire [1] | 70.50 | 58.00 |

PERCENTAGE OF ALLOY INGREDIENTS IN THE ELECTRODE

| | | |
|---|---|---|
| Manganese | 12.75 | 17.97 |
| Nickel | 2.30 | 3.26 |
| Chromium | 2.80 | 3.98 |
| Iron (substantially) | 71.00 | 59.04 |
| Carbon | 0.76 | 1.02 |
| Silicon | 0.06 | 0.08 |
| Slag Ingredients | Balance | Balance |

DEPOSIT ANALYSES (PERCENT)

| | | |
|---|---|---|
| Carbon | 0.66 | 1.00 |
| Manganese | 10.85 | 17.45 |
| Silicon | 0.07 | 0.06 |
| Nickel | 3.10 | 5.32 |
| Chromium | 2.81 | 5.00 |
| Phosphorus | 0.018 | 0.018 |
| Iron | (2) | (2) |

[1] Analyses: See Example 1.
[2] Balance, substantially.

a Coating weight in rod—29.5%.
b Coating weight in rod—42.0%.
c Binder ingredient.

In any of the foregoing examples, or those hereinafter, sodium or potassium alginate can be used interchangeably, and this also applies to sodium and potassium silicate.

TABLE 1

*Mechanical Properties*

Alloy as deposited (Examples 1 and 2)

Tensile strength _____ 120,000 p.s.i.
Yield strength _____ 70,000 p.s.i. (0.2% set).
Elongation _____ 40%.
Deposit hardness _____ 175 BHN.
Work hardenable _____ 500 BHN or higher.

TABLE 2

Rod diameter:                             Amperage range
  5/32" _____ 120 to 160
  3/16" _____ 170 to 225
  1/4" _____ 220 to 300

The rods of Examples 1 and 4 display similar behavior typical of results under the present invention. Thus, the weld deposits are non-magnetic and display no visible porosity or weld cracking. High, well rounded weld beads are obtained showing little tendency to flow. Arc action in particular is quite smooth. Slag usability and performance were quite good, of which more will be explained below in connection with data showing the critical nature of silicon content in welding rods of the austenitic manganese steel type under consideration.

While certain specific ingredients are used in the coating, these can be replaced by equivalent materials. Thus, potassium alginate can be substituted for sodium alginate, and the sodium silicate can likewise be replaced, all or in part, by potassium silicate. The asbestos is primarily a stiffener for the extrusion coating and can be readily substituted by equivalent materials. It will be appreciated that if a steel wire of different carbon content is used, then there will be a corresponding adjustment in graphite content in the coating, and while ferrochrome is advantageously employed as a source of chromium and as a source of some iron and carbon, substitution and adjustments can be employed in respect of this specific material. So far as overall combinations are concerned, it will be recognized that the coating represents about one-third by weight of the rod, more or less, and the steel core or shell the remainder.

The source of calcium carbonate and titanium dioxide can vary widely. For example, rutile and ilmenite are good sources of titanium dioxide. Calcium carbonate is available in many different mineral sources, Whiting for example, and is also available in different degrees of chemical purity under different commercial names.

The foregoing describes practices of the present invention manifest in so-called coated rods exemplified by FIG. 1 of the drawing, but as mentioned above, the present invention can also be practiced in connection with filled tubes in which event the slag forming ingredients (low hydrogen type) and alloy forming ingredients (for depositing austenitic manganese steel as in the foregoing examples) are tightly compacted in granular form in a rimmed, low carbon steel sleeve as shown in FIG. 2 of the drawing. The rimmed, low carbon steel sleeve contributes the following percentage of constituents to the aggregate filled tube rod analysis: 0.10 carbon; 0.40 manganese; 0.03 silicon; balance, substantially iron. Other and equivalent ferrous materials can be used for the sleeve.

In manufacturing a welding rod under the present invention in the form of a filled tube, the rimmed, low carbon steel strip or equivalent referred to above, in an open or troughed state (U-shaped), is passed continuously below a hopper from which the granular alloy and slag forming ingredients in a substantially dry state are flowed thereinto in a controlled manner. Beyond the filling station, the trough-shaped strip is gradually folded about the filler core and eventually a lapped tube is completed (see FIG. 2) of such shape and state as to tightly compact the filler ingredients.

The primary alloy and slag ingredients hereinafter identified in Example 5 are advantageously mixed in particle form with a selected portion of finely divided agglomerated particles comprising a mixture of the powdered constituency noted under Example 5. The sodium silicate or equivalent is a binder for the agglomerate particles. This mixture is in the nature of the coating of Examples 1 and 2, though not essentially so, since it serves to make available particles of finer size (particularly calcium carbonate and titania) than is possible with the loose individual primary fillers. The fine particles that make up the agglomerates are mixed with sodium silicate in a moist state, the mixture is dried, and then broken up into agglomerate bodies of the desired size.

Example 5 below sets forth the preferred narrow ranges for ingredients in a filled tube electrode under the present invention.

Example 5

PERCENT BY WEIGHT

| Material | Aim | Fillers, preferred range [1] |
|---|---|---|
| Primary fillers: | | |
|   Electrolytic manganese | 12.34 | 11.93–12.75 |
|   Nickel powder | 2.38 | 2.30–2.46 |
|   High carbon ferrochrome | 4.39 | 4.25–4.53 |
|   Powdered graphite | 0.43 | 0.42–0.44 |
|   Fluorspar (98% CaF$_2$) | 2.28 | 2.20–2.36 |
|   Titania | 0.92 | 0.89–0.95 |
|   CaCO$_3$ | 0.31 | 0.30–0.32 |
| Agglomerated particles [2] | 7.45 | 7.21–7.69 |
| Rimmed, low carbon steel strip [3] | 69.50 | 68.50–70.50 |

[1] Total filler content including agglomerated particles varies from 29.5 to 31.5 percent by weight total rod.
[2] Mixture of powdered manganese, nickel, ferrochrome and graphite, and titania, calcium carbonate and water glass (Na$_2$O+SiO$_2$)—percentages substantially; Example 2.
[3] 0.1% C, 0.4% Mn, 0.03% Si, 99.4% Fe.

The basic components in Example 5 analyze as follows and the analysis of the weld deposit is also set forth:

Example 5

PERCENT BASIC COMPONENTS

|  | Aim | Weld deposit analysis |
|---|---|---|
| Carbon | 0.92 | 0.75 |
| Manganese | 15.77 | 14.5 |
| Nickel | 2.95 | 3.5 |
| Chromium | 3.69 | 4.0 |
| Iron | 70.33 | [1] 77.15 |
| Silicon | 0.12 | 0.10 |
| $SiO_2$ [2] | 0.44 | |
| $CaCO_3$ | 1.54 | |
| $TiO_2$ | 1.63 | |
| $Na_2O$ | 0.12 | |
| $CaF_2$ [3] | 2.19 | |
| Other [4] | 0.30 | |
| Total | 100.00 | 100.00 |

[1] Substantially.
[2] From asbestos fibers present in binder, and from sodium silicate.
[3] Enhances arc action; discourages porosity in deposit.
[4] Impurities and other non-essential inclusions such as present in commercial grades of $CaCO_3$ and $TiO_2$.

While Example 5 discloses a narrow composition, ranges can vary within the following limits:

Example 6

FILLED TUBE—PERCENT

|  |  | Deposit analysis |
|---|---|---|
| Rod ingredients: | | |
| Carbon | 0.8 – 1.04 | 0.65–0.85 |
| Manganese | 14.68–16.84 | 13.5–15.5 |
| Nickel | 2.53– 3.37 | 3–4 |
| Chromium | 3.22– 4.15 | 3.5–4.5 |
| Iron | 65.40–75.77 | Balance substantially. |
| Silicon | 0. – 0.3 | Not more than 0.3. |
| Slag ingredients: | | |
| Silica | 0. – 0.60 | |
| $CaCO_3$ | 1.0 – 2.00 | |
| $TiO_2$ | 1.0 – 2.0 | |
| $Na_2O$ | 0. – 0.40 | |
| $CaF_2$ | 1.0 – 3.0 | |

Further variations based on Examples 4 and 6 are possible, and in fact a filled tube rod under the present invention can be varied in accordance with Example 4 above. In other words, we do not deem our invention to be limited to the precise percentages herein specified but rather contemplate a rod which will deposit a nickel-chromium modified austenitic manganese steel weld deposit analyzing in percentage approximately: carbon, 0.6 to 1.1; manganese, 10 to 18; with nickel 3 to 5.5 and chromium 2.5 to 5 for the desired solution to the reheating problem noted; balance, substantially iron. So far as welding performance is concerned on the basis of silicon content discussed in detail hereinafter, this will be manifest in a silicon content in the weld deposit not exceeding 0.3%, and will in nearly all instances be less than the amount included in the rod which is not to exceed about 0.3%.

As mentioned hereinabove, it has been found under the present invention that usability or performance of austenitic manganese steel welding rods is enhanced by maintaining low silicon contents in the rod. Thus, in commercial practice, performance of the rod (that is, ease of handling) is of primary importance to the welder and contributes directly to his welding efficiency. This consideration is something apart from the soundness and other metallurgical characteristics of the weld deposit which must meet specific requirements from the standpoint of strength, cracking propensity, porosity and so on.

Absence of "slag flaking" and any pronounced tendency for "slag adherence" to the weld deposit would manifestly contribute to welding efficiency. Thus, as the weldment cools, conditions are created which encourage the slag to pop from the weldment. This can be dangerous and annoying to the welder. If the slag is tightly adherent to the weldment, it follows that slag removal is difficult, but this must be done by the welder, conventionally by brushing or chipping, particularly in the instance of multiple or over-layer weld beads.

It is also important to the welder that there be as little "slag interference" as possible. This can be visualized by noting that there is no slag interference if the slag persistently stays at the edge of the molten pool during welding. If the slag persistently collects on the pool, there is maximum slag interference, and welding is virtually impossible. However, if the slag generally follows, and does not objectionably flow into the pool, slag interference is deemed not to be unacceptable. This leads to a consideration of a "slag cover" and "slag fluidity," other usability factors or characteristics. Naturally, a full, even, uniform slag cover over the weld is best, but a generally uniform 95–98% coverage from the side edges up around the bead and to the crater is acceptable. Less than this is deemed unacceptable. As for slag fluidity, an even molten cover immediately behind the weld pool is the most desirable condition. Some tendency for the slag to flow slightly back and forth with the motion of the electrode, or to solidify before completely covering the weld bead (not less than 95%) is not objectionable, but performance is unacceptable if the slag flows far back from the pool or solidifies in segregations.

It has been found in accordance with the present invention that when the silicon content is held to be not more than about 0.3%, all the above usability criteria are at least at an acceptable level, and in fact silicon percentages in excess of the 0.3% critical point tend toward unacceptable conditions of slag fluidity and slag flaking. In this connection, attention is directed to FIGS. 3 to 7 wherein the individual performance characteristics, discussed above, are plotted on the basis of quality ratings versus silicon content. The quality ratings range from "1" to "5" on the basis of assigned values set forth along with other pertinent data in the appendix to this specification. A value of "3" represents an acceptable condition as defined above and as will be apparent from the appendix. Further, a quality rating of "1" is poorest—"5" is best. The rods used for collecting these data were compounded in accordance with Example 2 above (except for silicon variations as will be noted) and produced deposits analyzing approximately as follows: carbon, 0.75%; manganese, 14%; chromium, 4%; nickel, 3.5%; balance substantially iron except for silicon and impurities. The slag forming ingredients included calcium carbonate, titania and sodium silicate in the proportions 2.2–1.3–1.0. The rod of Example 2 has a silicon content of only 0.07%, and the silicon content was gradually increased in obtaining the data plotted in FIGS. 3 to 7.

For a quality rating, then, the value of "3" is critical and is represented by the bold horizontal line in each of FIGS. 3 to 7. The encircled dots in FIGS. 3 to 7 represent the average of observed quality rating values. The curves for slag fluidity (FIG. 4) and slag flaking (FIG. 5) descend rather sharply as will be noted, and the curve in FIG. 4 crosses the "acceptable" line at a silicon value of about 0.3% in the rod, which therefore represents the critical silicon content not to be exceeded under the present invention, since all other quality ratings for the various performance criteria investigated were acceptable at silicon contents in excess of this. Thus, for example, the curve in FIG. 5 crosses the "acceptable" line at a silicon content of about 0.32%. In order that it can be readily ascertained that a silicon level of about 0.3% or less in the rod will assure quality ratings of "3" or above for all performance values plotted, FIGS. 3 to 7 have been shaded in the area that lies between the particular curve and the critical "acceptable" line. In all instances, exceptionally good bead contour and build-up, characterizing an efficient weld, were encountered.

It has also been found that inclusions of nickel and chromium are unimportant to the role of low silicon, but it is to be borne in mind that nickel and chromium are important to the development of mechanical properties of a weld deposit under the present invention. Referring to FIGS. 8 to 10, these include performability curves based on three coated rods wherein the carbon and manganese content was held constant and wherein the slag forming ingredients (low hydrogen) included calcium carbonate, titania and sodium silicate in the proportions 2.2–1.3–1.0. The variations were in silicon, nickel and chromium content as noted in the plot data. It will be observed that the performance or usability quality dropped off in a substantially uniform slope for all plots in FIGS. 8 to 10 as the silicon level was increased, whether the rod contained neither nickel nor chromium additions (A), contained only chromium addition (B), or contained only nickel addition (C). Referring to FIG. 11, it will be noted that nickel and chromium inclusions effect bead build-up and contour. Thus, with neither chromium nor nickel present (FIG. 11A) bead contour and build-up valuations drop off sharply with increasing silicon content, but with chromium or nickel additions this becomes less drastic, particularly in the instance of chromium.

It was mentioned above that a consistent problem in the art of manganese steel welding has been that of reheating when producing multiple over-lay weld deposits. The problem is manifest in embrittlement and low yield strength. In Table 1 hereof, it is disclosed that a yield strength of 70,000 p.s.i. (0.2% set) can be obtained under the present invention, together with a tensile strength of 120,000 p.s.i. Elongation is 40%. These data can be further elaborated upon by noting that the test patterns from which the data in Table 1 were obtained embraced yield strength values of from 61,000 to 80,160 with corresponding variations in tensile from 111,000 to 123,500. The values were obtained by laying multiple bead deposits in a base metal part presenting a long V-notch to produce a composite including a triangular multiple weld deposit characterized by one weld deposit atop and aside others. The part for test was taken from the center of the multiple deposit and hence the sample would display the average of many multiple or over-lay deposits.

The combination of manganese, carbon, chromium and nickel within the proportions or ranges specified is important for this austenitic manganese steel, and give unexpected results. In this connection it should be first noted that according to United States Patent No. 2,149,999, nickel in the amount of 2.75 to 5.00 percent is included in a welding electrode having manganese and carbon within the ranges specified hereinabove. However, according to this patent a weld deposit obtained therefrom showed only about "12 to 20% elongation before failure." This value is well under the 40% elongation obtained under the present invention.

According to United States Patent No. 2,156,299, an austenitic manganese steel welding rod is to contain not more than 0.35% carbon, 13 to 26% manganese, 3 to 15% chromium and nickel in an amount not to exceed 4%. The chromium content is required to be approximately one-half the manganese content. It is concluded in this patent that the limits specified are to "be strictly adhered to in multi-layer welding, because chromium-manganese steel welding rods lying outside the limits . . . produce brittle welds when a layer, previously deposited, is reheated during the deposition of a subsequent layer." In contrast to this, the rod carbon content in the present instance commenced at a value almost twice that of aforesaid Patent No. 2,156,299, there is no critical relationship between the proportion of chromium to proportion of manganese herein, and nickel under the present disclosure is deemed essential to mechanical or metllurgical properties of the weld deposit, not arbitrary. Moreover, it is to be noted that United States Patent No. 2,156,299 reports a tensile strength of 72,228 p.s.i. for a particular alloy weld deposit within that specification, presumably the best, and yet that value is well below that for the present deposit.

The slag forming ingredients in the present invention essentially are of the low hydrogen type, that is, essentially free of combined moisture, and while calcium carbonate and titania are important additions, these can be supplemented to include any one of the following for specific purposes: magnesium carbonate, calcium silicate, and calcium fluoride ($CaF_2$). Calcium carbonate is, of course, a slag ingredient which provides a protective carbon dioxide gaseous shield for the arc and the molten weld metal pool. Slag properties can be further improved by the presence of manganese oxide, and a deoxidizer such as manganese, titanium or ferrotitanium may be included among the slag forming ingredients to reduce any tendency toward melt gassiness and to further safeguard against deposit porosity.

As explained above, the welding electrodes of the present invention as specifically adapted for depositing a strong, tough, non-porous, crack-free, austenitic manganese steel. In fact, no objectionable porosity is evident on grinding or X-ray examination. The deposit which contains nickel and chromium displays superior yield strength and ductility as a significant combination of mechanical properties, providing toughness and resistance to metal flow under impact. The deposit is particularly resistant to reheating problems. It is possible to use the electrode with either alternating or direct current, and vertical as well as horizontal welds can be easily deposited. Of particular significance is that the slag can be easily cleaned and brushed off after deposition, and there is no violent slag popping or flaking. There has, to the best of our knowlege, been no recognition heretofore that this is related to the silicon content of the rod. The slag consistency in the present instance is generally uniform during welding, and this contributes to good bead build-up further brought about by the achievement of a good balance between the alloy components and slag forming components.

It may finally be mentioned that for the most part the prior art has turned to low carbon analyses (low in respect to conventional cast manganese steel) in an endeavor to avoid cracking in weld deposits. Under the present invention, however, it is possible to obtain deposits containing carbon more nearly approaching the nominal range specified for standard manganese steel, which is about one-tenth the manganese content.

As noted above, we do not deem our invention to be limited to the precise percentages disclosed in the examples. Rather, based on the examples set forth above and our previous experiences in the art of austenitic manganese steel, we contemplate a low-hydrogen, coated or filled rod, analyzing about (percentage): carbon, 0.7–1.4; manganese, 12–20; nickel, and chromium, each 2 to 5 for the advantages noted; and silicon, not more than 0.3; balance, substantially all iron.

Hence, while preferred embodiments of the invention have been described, it will be recognized by those skilled in the art that these are capable of variation and modification, and we therefore do not wish to be limited to the precise details set forth, but desire to avail ourselves of such changes and alterations as fall within the purview of the following claims.

APPENDIX

*Numerical Rating System for Performance Characteristics*

[Best condition 5; worst condition 1]

Slag cover:
 5—Full, even, uniform
 4—Over 98% cover, generally uniform
 3—Between 95 and 98% cover, generally uniform 2—Between 80 and 95% cover, uneven, not uniform
1—Less than 80% cover, slag to edges and crater Slag interference:
- 5—Slag readily stays at edge of molten pool
- 4—Slag requires some control through electrode manipulation
- 3—Slag intermittently threatens and crowds pool
- 2—Slag tends to cover pool, physically intefering with arc
- 1—Slag collects on pool, making welding impossible Slag flaking:
- 5—No flaking
- 4—Slag loosens, crater area only
- 3—Slag flakes from crater area
- 2—Slag flakes from less than 25% of weld surface
- 1—Slag flakes from over 25% of weld surface Slag fluidity:
- 5—Even molten cover on metal behind weld pool
- 4F—Tends to pull back from pool
- 4R—Tends to solidify quickly after deposition
- 3F—Flows back and forward over pool with arc motion
- 3R—Tends to solidify before covering weld bead
- 2F—Flows far back from pool, flows freely away from arc
- 2R—Solidifies in center of bead or in islands before metal freezes
- 1F—All flows to sides or over crater
- 1R—Solidifies to prevent normal electrode manipulation Adherent slag layer:
- 5—No adherent slag
- 4—Traces of adherent slag
- 3—Less than 5% of area covered with adherent slag
- 2—From 5 to 25% of area covered with adherent slag
- 1—Over 25% of area covered with adherent slag Bead contour and build up:
- 5—Thick, well shouldered, uniform; smooth bead-base junction
- 4—Thick, some pock marks, washes or other irregularities; smooth bead-base junction
- 3—Medium thickness, some irregularities; smooth bead-base junction
- 2—Flat to medium thickness, irregularities mark up to one half surface area
- 1—Flat, generally irregular surface, undercut or over-hang at edges

We claim:

1. A welding rod containing carbon about 0.7 to 1.4%, manganese about 12 to 20%, up to about 5% each of nickel and chromium, balance substantially all iron, and containing slag forming ingredients, the total silicon content of the rod including that of the slag forming ingredients being not more than about 0.3% silicon.

2. A rod according to claim 1 which contains about 2 to 5 percent each of nickel and chromium.

3. A welding rod comprising a low carbon steel member carrying alloy ingredients and slag forming ingredients, said slag forming ingredients including titanium dioxide and calcium carbonate, and the total silicon content of the rod including that of the slag forming ingredients being not more than about 0.3% silicon, said rod analyzing in percentage approximately as follows:

Manganese _____ 12 to 20
Nickel _____ Up to 5
Chromium _____ Up to 5
Carbon _____ 0.7 to 1.4
Iron balance, substantially.

4. A welding rod including slag forming ingredients, the total silicon content of which does not exceed approximately 0.3%, and in which the essential alloy ingredients for the weld deposit analyze in percentage approximately as follows:

Manganese _____ 12 to 20
Nickel _____ Up to 5
Chromium _____ Up to 5
Carbon _____ 0.7 to 1.4
Iron balance, substantially.

5. A welding rod according to claim 1 in the form of a tube filled with granular alloy and slag forming ingredients.

6. A welding rod according to claim 1 in the form of a solid wire bearing an exterior coating of alloy and slag forming ingredients.

References Cited in the file of this patent

UNITED STATES PATENTS

| | | |
|---|---|---|
| 1,732,202 | Hall | Oct. 15, 1929 |
| 2,711,959 | De Long et al. | June 28, 1955 |
| 2,789,924 | Jessen | Apr. 23, 1957 |